(12) United States Patent
Stührwoldt

(10) Patent No.: US 12,371,106 B2
(45) Date of Patent: Jul. 29, 2025

(54) MOBILE CRANE VEHICLE FRAME HAVING DETACHABLY CONNECTED FRAME PARTS

(71) Applicant: MANITOWOC CRANE GROUP FRANCE SAS, Dardilly (FR)

(72) Inventor: Dieter Stührwoldt, Wilhelmshaven (DE)

(73) Assignee: Manitowoc Crane Group France SAS, Dardilly (FR)

( * ) Notice: Subject to any disclaimer, the term of this patent is extended or adjusted under 35 U.S.C. 154(b) by 315 days.

(21) Appl. No.: 17/667,035

(22) Filed: Feb. 8, 2022

(65) Prior Publication Data

US 2022/0250693 A1    Aug. 11, 2022

(30) Foreign Application Priority Data

Feb. 8, 2021    (DE) .......................... 102021102844.2

(51) Int. Cl.
  *B62D 27/06*    (2006.01)
  *B66C 23/62*    (2006.01)

(52) U.S. Cl.
  CPC ............ *B62D 27/065* (2013.01); *B66C 23/62* (2013.01)

(58) Field of Classification Search
  CPC ........ B62D 27/065; B66C 23/62; B66C 23/78
  See application file for complete search history.

(56) References Cited

U.S. PATENT DOCUMENTS

| | | | |
|---|---|---|---|
| 5,348,171 A | 9/1994 | Haman et al. | |
| 6,250,413 B1 * | 6/2001 | Horton | B62D 27/065 180/291 |
| 6,361,244 B1 * | 3/2002 | Ni | B62D 23/005 403/345 |
| 2008/0035814 A1 * | 2/2008 | Xie | B62D 27/065 248/228.1 |
| 2008/0174150 A1 * | 7/2008 | Yamada | B62D 27/065 296/203.01 |
| 2020/0130653 A1 * | 4/2020 | Betz | E06C 5/16 |
| 2022/0111897 A1 * | 4/2022 | Kelk | B62D 27/065 |

(Continued)

FOREIGN PATENT DOCUMENTS

| | | |
|---|---|---|
| DE | 19728822 A1 | 3/1999 |
| DE | 102008006119 B3 | 6/2009 |

(Continued)

OTHER PUBLICATIONS

Search Report and Opinion issued in connection with EP Pat. Appl. 21 206 339, dated May 19, 2022.

(Continued)

*Primary Examiner* — Paul N Dickson
*Assistant Examiner* — Tiffany L Webb
(74) *Attorney, Agent, or Firm* — Cook Alex Ltd.

(57) ABSTRACT

A vehicle frame and a mobile crane having such a vehicle frame includes a first frame part and a second frame part which can be detachably connected to each other via a common interface. The interface includes multiple points at which it is bolted to bolting elements assigned to the respective frame parts. The interface also includes at least one profile along which it engages with engaging elements assigned to the respective frame parts which, when the bolting elements are aligned with each other, are in a mutually positive-fit engagement across their extent.

9 Claims, 3 Drawing Sheets

(56) References Cited

U.S. PATENT DOCUMENTS

2022/0111898 A1* 4/2022 Kelk ............... B62D 27/06
2022/0111901 A1* 4/2022 Kelk ............... B62D 21/152
2023/0264744 A1* 8/2023 Kim ............... B62D 21/152
                                                    296/204

FOREIGN PATENT DOCUMENTS

| DE | 102017003730 A1 | 10/2018 |
| JP | S6428199 A | 3/1989 |
| JP | 2019218168 A | 12/2019 |
| JP | 2020169066 A | 10/2020 |

OTHER PUBLICATIONS

JPO Office Action issued in connection with JP Pat. Appl. No. 2022-000081, dated Jan. 10, 2023.
Search Report issued in connection with DE Pat. Appl. 10 2021 102 844.2, dated Nov. 15, 2021.
CNIPA Office Action in connection with CN application No. 202210087181.0, dated Dec. 31, 2024.

* cited by examiner

MOBILE CRANE VEHICLE FRAME HAVING DETACHABLY CONNECTED FRAME PARTS

FIELD

The present invention relates to a vehicle frame for a mobile crane comprising at least two frame parts which can be detachably connected to each other via a common interface. The invention also relates to a mobile crane comprising such a vehicle frame.

BACKGROUND

Mobile cranes are specifically designed to be transported to their site of operation by regular road transport. To this end, however, strict legal requirements with regard to a maximum possible axle load must, among other things, be adhered to. One common technical measure for reducing the vehicle weight during road transport is to transport individual crane components separately from the actual crane vehicle, which are then assembled only once they are at the site of operation. Within this context, EP 1 190 979 A2 even suggests disassembling an outrigger box, which is bolted to the rear of the vehicle, for road transport and replacing it with an auxiliary chassis which engages with the same receptacles on the vehicle frame. When the crane is in operation, the bolt connection between the outrigger box and the vehicle frame must absorb large forces and moments and be accordingly designed and dimensioned to this end.

SUMMARY

It is the object of the present invention to develop this prior art and to provide a mobile crane vehicle frame comprising an interface, between frame parts which can be disassembled from each other, which exhibits an improved load-bearing capacity as compared to known solutions.

This object is achieved by a vehicle frame and a mobile crane in accordance with the examples of the present disclosure.

The mobile crane vehicle frame in accordance with the invention comprises a first frame part and a second frame part which can be detachably connected to each other via a common interface, wherein the interface comprises: multiple points comprising bolting elements assigned to the respective frame parts; and also at least one engagement path comprising engaging elements assigned to the respective frame parts which, when the bolting elements are aligned with each other, are in a mutually positive-fit engagement across their extent.

In other words, the vehicle frame comprises one or more interfaces via which at least two frame parts can respectively be detachably connected to each other. The vehicle frame can for example be dismantled at one or more such interfaces into a corresponding number of frame parts, in order for example to transport them individually to the site of operation by road. One frame part can for example comprise and/or accommodate the chassis of the mobile crane. Other frame parts can comprise and/or form a front or rear outrigger box which displaceably mounts the outrigger supports arranged on both sides of the vehicle frame, together with the outrigger members and outrigger plates.

In accordance with the invention, the respective frame parts are connected to each other via multiple bolt connections of the interface, wherein the respective frame parts also mutually engage with each other via one or more elongated portions. This additional positive-fit engagement crucially relieves the bolt connections while the crane is in operation, such that forces and moments can be transmitted across the interface substantially more efficiently.

A reciprocal engagement between the individual engaging elements is then to be understood to mean that the engaging elements which are in engagement with each other are mutually supported across a certain distance. The individual engaging elements can for example comprise a multitude of support surfaces across their extent, via which the other engaging element in each case can be supported when subject to a corresponding load. In other words, the transmission of force between the engaging elements which are in engagement can be distributed substantially evenly across their extent. The individual corresponding engaging elements can for example exhibit a profile which is uniform across their extent and comprises regularly recurring protrusions and/or notches via which they engage with the other engaging element in each case. The mutually corresponding engaging elements can in particular exhibit a similar or identical profile.

In accordance with another embodiment of the present invention, the engaging elements of at least one and in particular all of the engaging profiles of the interface are designed, at least in portions, as flat engaging plates. Engaging plates which are shaped and/or curved in any way across their extent are in principle conceivable. In order for example to support a torsional moment via engaging plates which are in engagement, the latter could for example form, across their extent, a radius around a neutral fibre of the torsional load on the vehicle frame. Engaging plates which are linear across their extent are comparatively very well suited to absorbing forces which are directed parallel to their extent.

In accordance with another embodiment of the present invention, the bolting elements of at least one and in particular all of the points at which the interface is bolted are aligned by joining the relevant frame parts in a movement, in particular by means of a single translational movement, wherein it is also possible to move the engaging elements of at least one and in particular all of the engaging profiles into engagement, wherein it is in particular possible to form, on one or more engaging profiles, an engagement which can transmit forces in a direction extending perpendicular to the direction in which the bolting elements are aligned.

In accordance with another embodiment, at least two points at which the interface is bolted are respectively arranged in planes of the interface which are spaced apart from each other, wherein at least two mutually spaced engaging profiles extend transversely to the planes. The points at which the interface is bolted can in particular be distributed on two planes, wherein two engaging profiles extend transversely to these planes. The planes and the engaging profiles can in particular encircle a central region of the interface through which for example neutral fibres for occurrent bending or torsional stresses of the frame interface extend. In one specific embodiment, the planes and the engaging profiles delineate a rectangular region of the interface.

In another embodiment, one or more bolting elements is/are formed on a bracket which can be designed as a simple bracket or as a forked bracket on a corresponding frame part, wherein two or more bolting elements can in particular be formed on a common bracket. The brackets can also serve to position the bolting elements in the plane in which the engaging elements substantially interlock. In other words, forces are introduced and/or discharged substantially within one plane via the individual bolting elements and engaging elements.

It is also possible for the engaging elements of at least one engaging profile to extend in the horizontal or vertical direction in relation to the spatial position of an operable crane.

The engaging elements of at least one engaging profile can also comprise multiple projections which taper towards the other engaging element of the engaging profile in each case, in order to form a positive-fit engagement. In this way, such an engaging profile can immediately form a kind of positioning aid when the frame parts are joined and ultimately bolted to each other, since the engaging elements automatically centre the frame parts, so to speak, as they are joined.

The engaging elements of at least one engaging profile can also comprise multiple projections which extend in the horizontal or vertical direction in relation to the spatial position of an operable crane.

Although it is in principle possible to fasten the engaging elements of the respective engaging profiles in a fixed position on the respective frame parts, for example using known positive-fit, frictional-fit or material-fit connections such as rivet connections, screw connections or welded connections, at least one engaging element of at least one engaging profile can then be arranged on the respective frame part such that it is positionally adjustable, in particular by means of an adjusting mechanism and/or in the direction of its extent. A corresponding engaging element can then be held in position on the frame part by means of the adjusting mechanism and/or by means of a frictional-fit or positive-fit connection, wherein one or more screw connections can in particular serve to fix the corresponding engaging element in a variable position on the frame.

Another aspect of the invention relates to a mobile crane comprising a vehicle frame in accordance with any one of the embodiments described above.

BRIEF DESCRIPTION OF THE DRAWINGS

The present invention is described below in more detail on the basis of a preferred embodiment and by referring to the accompanying figures. The invention can comprise all of the features described here, individually and in any expedient combination.

There is shown.

DESCRIPTION

Figure 1:
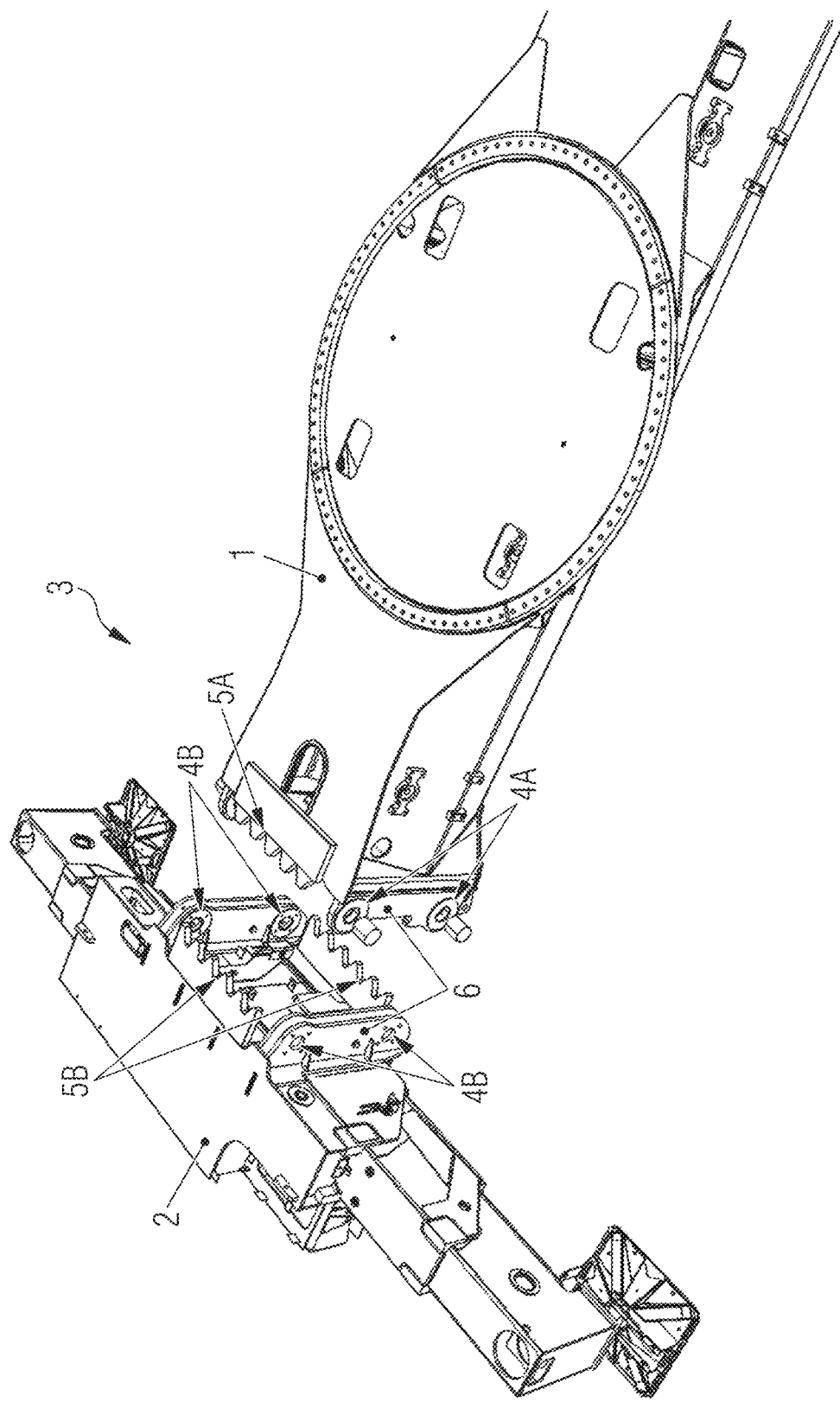
FIG. 1 a vehicle frame in accordance with the invention, comprising frame parts which are separated from each other.

In the embodiment shown in FIG. 1, the central main frame of the mobile crane, which ultimately also accommodates the chassis components and the turntable mounting, forms a first frame part 1. The second frame part 2 is formed by the rear-end outrigger box which displaceably mounts the outrigger supports which can be extended on both sides of the mobile crane. In order to assembly the outrigger box 2 on the main frame 1, it is guided onto the main frame 1 in the longitudinal direction of the vehicle, such that the two contact each other in the region of their common interface 3. This step can be performed autonomously by the crane as part of its so-called "self-assembly", in which the outrigger box 2 which is placed on a transport vehicle is received by the crane itself and positioned on the rear of the vehicle in the region of the interface 3.

On the sides of the main frame 1, the interface 3 comprises two simple brackets which extend in the vertical direction on both sides of the main frame 1 and each comprise two bolt eyes 4A. Two engaging plates 5A comprising a multitude of identically shaped, triangular projections extend between and perpendicular to these simple brackets. The complementary elements for a positive-fit connection with the main frame 1 are location on the sides of the outrigger box 2, i.e. two likewise horizontally extending engaging plates 5B, at the end regions of which two forked brackets extend, each comprising two bolt eyes 4B. As can be seen, the brackets and the engaging plates 5A, 5B delineate as large a rectangular region as possible in the plane of the interface 3, in order to be able to optimally transmit forces and moments between the frame parts 1 and 2.

When the outrigger box 2 approaches the main frame 1, the simple brackets of the main frame 1 move into the forked brackets of the outrigger box 2, while the engaging plates 5A and 5B of the frame parts 1 and 2 are simultaneously moved into engagement. This ultimately creates a multitude of evenly distributed abutting surfaces across the extent of the two engaging profiles, via which not only the main frame 1 can be supported on the outrigger box 2, but also the outrigger box 2 can be supported on the main frame 1.

Figure 2:
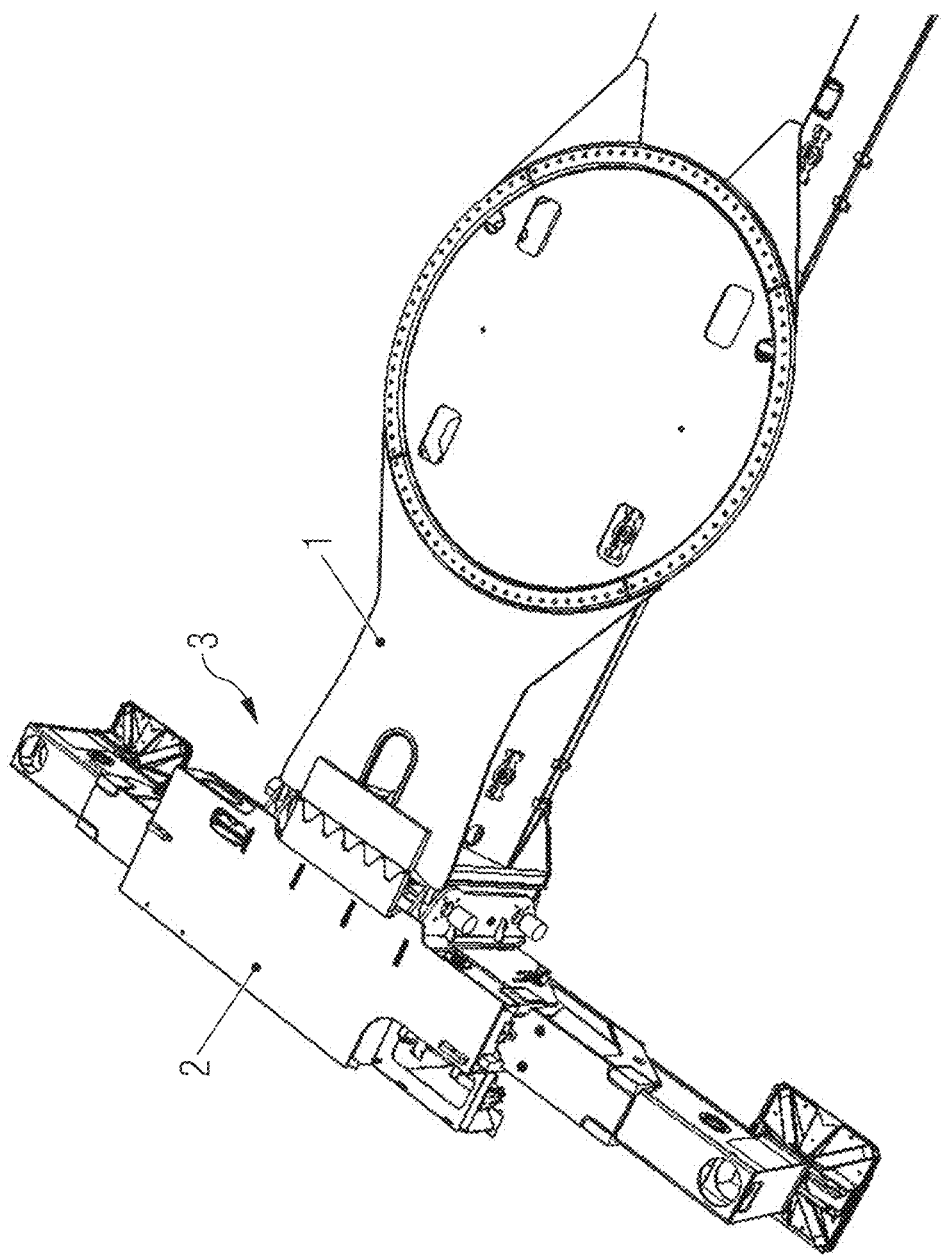
FIG. 2 the vehicle frame from FIG. 1, with the frame parts positioned with respect to each other.

FIG. 2 shows the frame parts 1 and 2 in their final position in which they contact each other at the interface 3 and can be bolted to each other at the points at which the interface is bolted, wherein the bolts, which are not indicated in more detail in FIG. 2, can be hydraulically inserted into and also withdrawn again from the corresponding receptacles 4A and 4B.

Figure 3:
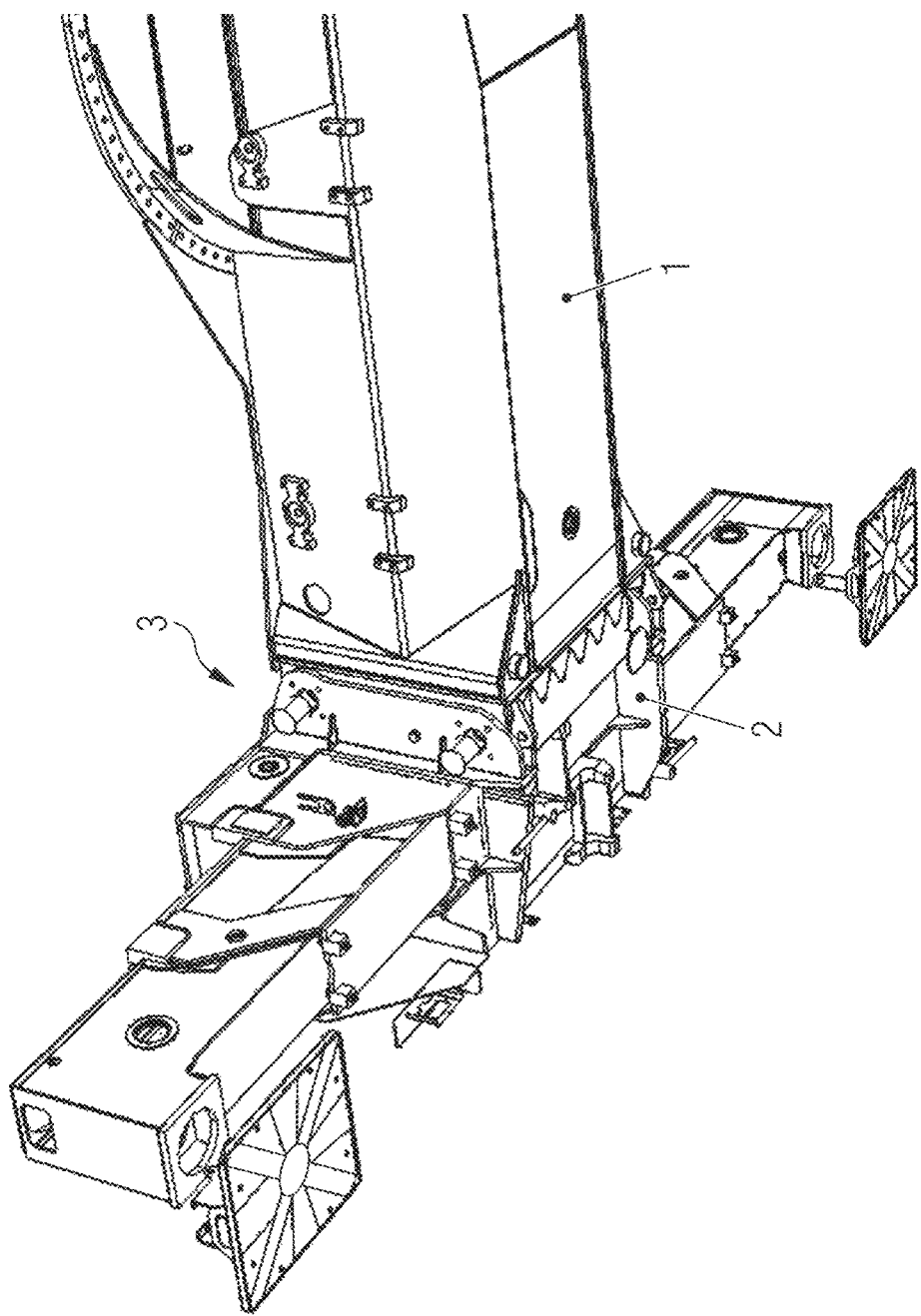
FIG. 3 the vehicle frame from FIG. 1, with the frame parts fully bolted to each other.

FIG. 3 shows the outrigger box 2 once it has been fully bolted to the main frame 1.

What is claimed is:

1. A vehicle frame for a mobile crane, the vehicle frame comprising a first frame part and a second frame part which can be detachably connected to each other via a common interface, wherein the interface comprises multiple points comprising bolting elements assigned to the respective frame parts, characterised in that the interface also comprises at least one engagement section with engaging elements assigned to the respective frame parts which are designed, at least in portions, as engaging plates, wherein each of the engaging plates includes recurring protrusions and notches along its extent, and wherein the engaging plates, when the bolting elements are aligned with each other, are in a mutually positive-fit engagement along their extent.

2. The vehicle frame in accordance with claim 1, wherein the bolting elements of at least one of the points at which the interface is bolted are designed to be aligned substantially in a first direction, and wherein the engaging elements of the at least one engagement section are designed to form an engagement which transmits forces in a direction perpendicular to the first direction.

3. The vehicle frame in accordance with claim 1, respectively comprising at least two points at which the interface is bolted, which are arranged in planes which are spaced apart from each other, and at least two mutually spaced engagement section extend transversely thereto.

4. The vehicle frame in accordance with claim 1, wherein at least two bolting elements are respectively arranged on a common bracket.

5. The vehicle frame in accordance with claim 1, wherein the engaging elements of the at least one engagement section extend in a horizontal or vertical direction.

6. The vehicle frame in accordance with claim 1, wherein the engaging elements of the at least one engagement section comprise multiple projections which taper towards the other engaging element of the at least one engagement section in each case.

7. The vehicle frame in accordance with claim 1, wherein the engaging elements of the at least one engagement section comprise multiple projections which extend in the horizontal or vertical direction.

8. The vehicle frame in accordance with claim 1, wherein at least one engaging element of the at least one engagement section is arranged on the respective frame part such that it is positionally adjustable by an adjusting mechanism and/or in a direction of its extent.

9. A mobile crane comprising a vehicle frame in accordance with claim 1.

* * * * *